United States Patent
Neubauer

(10) Patent No.: US 12,398,790 B1
(45) Date of Patent: Aug. 26, 2025

(54) ELECTRIC AXLE WITH TWO-SPEED HIGH RATIO COAXIAL REDUCER AND SEPARATE HIGH SPEED RATIO BOOSTER

(71) Applicant: Schaeffler Technologies AG & Co. KG, Herzogenaurach (DE)

(72) Inventor: Benedikt Neubauer, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/660,916

(22) Filed: May 10, 2024

(51) Int. Cl.
*F16H 37/08* (2006.01)
*B60K 17/08* (2006.01)
*B60K 17/16* (2006.01)

(52) U.S. Cl.
CPC .......... *F16H 37/082* (2013.01); *B60K 17/08* (2013.01); *B60K 17/165* (2013.01); *F16H 2200/0021* (2013.01); *F16H 2200/0034* (2013.01); *F16H 2200/2007* (2013.01)

(58) Field of Classification Search
CPC .......... F16H 37/082; F16H 2200/0021; F16H 2200/0034; F16H 2200/2007; B60K 17/08; B60K 17/165
See application file for complete search history.

(56) References Cited

U.S. PATENT DOCUMENTS

| | | | |
|---|---|---|---|
| 4,040,312 A | 8/1977 | Tappan et al. | |
| 5,807,205 A | 9/1998 | Odaka et al. | |
| 8,419,579 B2 | 4/2013 | Rosemeier et al. | |
| 9,777,816 B2 | 10/2017 | Petersen et al. | |
| 10,760,653 B2 | 9/2020 | Schilder et al. | |
| 10,995,835 B2 * | 5/2021 | Engerman | F16H 37/082 |
| 11,067,152 B2 * | 7/2021 | Biermann | F16H 3/66 |
| 11,383,597 B2 | 7/2022 | Kumar | |
| 11,679,670 B2 | 6/2023 | Liu et al. | |
| 11,739,819 B2 * | 8/2023 | Uehara | F16H 37/082 475/150 |
| 2003/0010547 A1 | 1/2003 | Wachauer | |
| 2009/0111641 A1 * | 4/2009 | Kim | B60K 17/043 477/5 |
| 2009/0182474 A1 * | 7/2009 | Ross | B60K 6/52 180/242 |
| 2011/0287884 A1 | 11/2011 | Unno et al. | |
| 2020/0096084 A1 * | 3/2020 | Engerman | F16H 3/006 |

(Continued)

FOREIGN PATENT DOCUMENTS

| | | |
|---|---|---|
| DE | 102016011263 A1 | 6/2017 |
| DE | 102018101269 A1 | 7/2019 |
| DE | 102018120446 A1 | 2/2020 |

(Continued)

OTHER PUBLICATIONS

Woodgears.ca [online] 2014 [retrieved Dec. 3, 2024] Retrieved from the Internet: https://woodgears.ca/gear/ratio.html, 2014.

*Primary Examiner* — Edwin A Young
(74) *Attorney, Agent, or Firm* — Volpe Koenig

(57) ABSTRACT

An electric beam axle includes an electric motor, a high-speed ratio booster, a shiftable reducer, and a differential. The shiftable reducer includes a planetary gearset and the differential at least one of a spur or bevel gear differential. The electric motor, high-speed ratio booster, shiftable reducer and differential are aligned coaxially providing a radially compact electric beam axle.

14 Claims, 1 Drawing Sheet

(56) References Cited

U.S. PATENT DOCUMENTS

2024/0225366 A1  7/2024  Chupka

FOREIGN PATENT DOCUMENTS

| DE | 102019131764 A1 | 5/2021 |
| DE | 102022208157 A1 | 2/2024 |
| DE | 102022209071 A1 | 2/2024 |
| JP | 2002104001 A | 4/2002 |

* cited by examiner

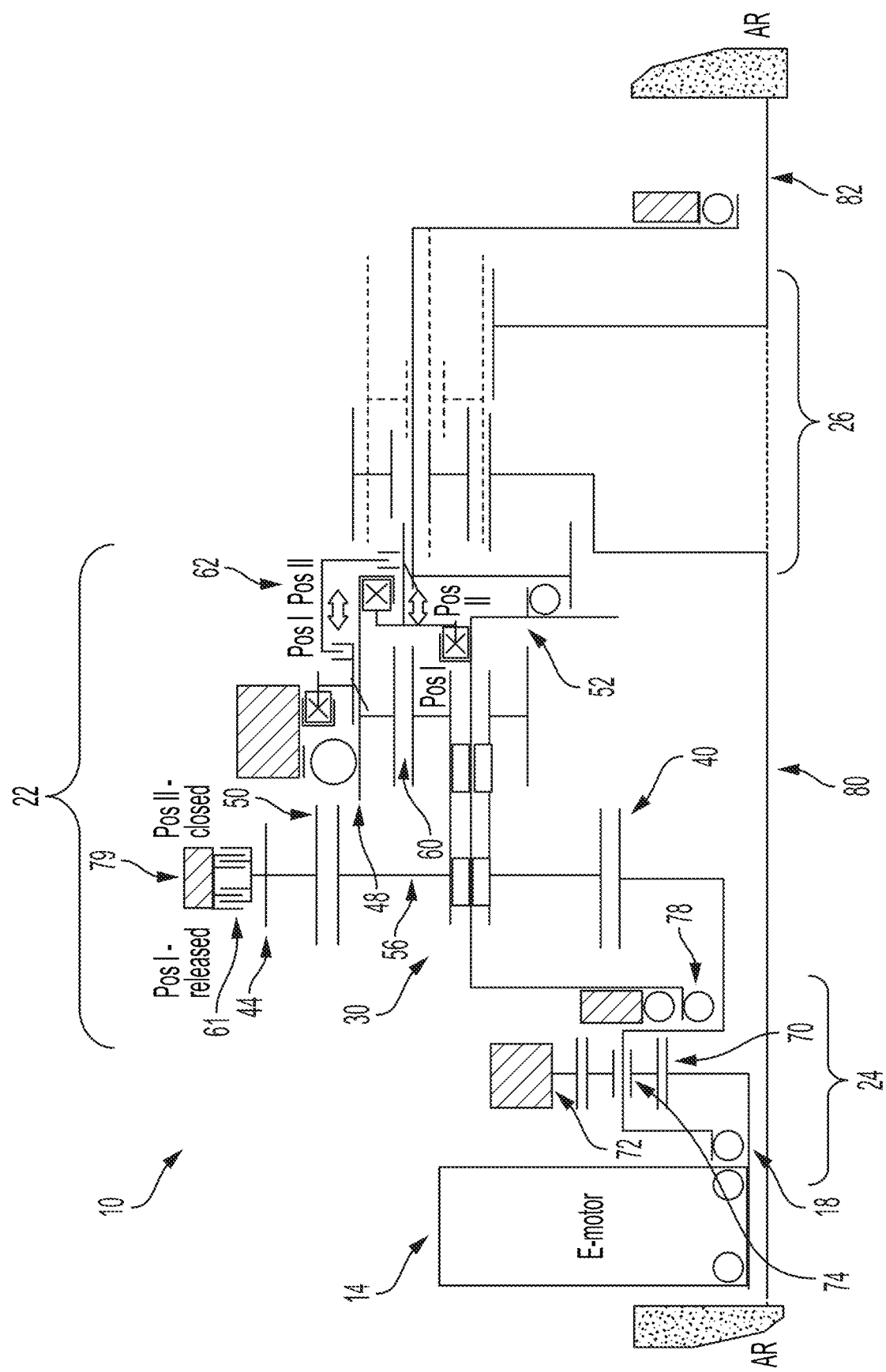

ELECTRIC AXLE WITH TWO-SPEED HIGH RATIO COAXIAL REDUCER AND SEPARATE HIGH SPEED RATIO BOOSTER

FIELD OF INVENTION

The present disclosure related to a drivetrain for a vehicle. It is particularly concerned with a two-speed differential for an electric beam axle for an electric or hybrid vehicle.

BACKGROUND

Electric beam axles are used in hybrid and electric vehicles to transfer rotational energy from an electric motor to the wheels of the vehicle, causing the vehicle to propel in a specified direction. Electric beam axles include the electric motor and the gearing/gearbox required to transfer the rotational energy from the electric motor to the wheels of the vehicle. Based on design requirements, there is a limited space envelope in which the electric motor and the gearing/gearbox must be positioned within the electric beam axle. In addition, electric beam axles for truck applications often require high and low range gearing capabilities for normal and high torque driving conditions, respectively. Therefore, there is a need for an electric beam axle that can efficiently fit the electric motor and the gearing/gearbox for a hybrid and/or electric vehicle within a limited space envelope while maintaining full functionality and high and low range gearing capabilities.

SUMMARY

In one aspect, the present disclosure is directed to an electric beam axle for a hybrid or electric vehicle. The electric beam axle includes an electric motor, a planetary ratio booster coupled to the electric motor, a shiftable high ratio reducer driven by the planetary ratio booster, and a differential driven by the shiftable high ratio reducer and connectable to a first vehicle wheel and a second vehicle wheel.

The electric motor, planetary ratio booster, shiftable high ratio reducer, and differential can be coaxially aligned. The shiftable high ratio reducer can include a compound planetary gearset having a plurality of stepped planet gears supported by a planet carrier. The compound planetary gearset includes a first ring gear and a second ring gear. Each stepped planet gear can include a large planet gear meshed to the first ring gear and a small planet gear meshed to the second ring gear, and the large planet gear and small planet gear rotate together and are connected to transfer torque. The compound planetary gearset of the shiftable high ratio reducer can include at least one clutch for selectively engaging the planet carrier with the differential in a first drive mode. The at least one clutch can selectively engage the second ring gear with the differential in a second drive mode. The planetary ratio booster can include a ring gear, and the ring gear of the planetary ratio booster can be positioned axially between the electric motor and the large planet gears of the planetary gearset of the shiftable high ratio reducer. The planetary ratio booster can include an input shaft coupled to the electric motor. The differential can include at least one of a spur gear differential or a bevel gear differential.

In accordance with another aspect, a gear train for an electric vehicle comprises a planetary ratio booster having an input shaft for receiving rotational energy from an electric motor, a shiftable high ratio reducer driven by the planetary ratio booster, and a differential driven by the shiftable high ratio reducer and connectable to a first vehicle wheel and a second vehicle wheel.

The planetary ratio booster, shiftable high ratio reducer, and differential can be coaxially aligned. The shiftable high ratio reducer can include a compound planetary gearset having a plurality of stepped planet gears supported by a planet carrier. The compound planetary gearset includes a first ring gear and a second ring gear. Each stepped planet gear can include a large planet gear meshed to the first ring gear and a small planet gear meshed to the second ring gear, and the large planet gear and small planet gear rotate together and are connected to transfer torque. The compound planetary gearset of the shiftable high ratio reducer can include at least one clutch for selectively engaging the planet carrier with the differential in a first drive mode. The at least one clutch can selectively engage the second ring gear with the differential in a second drive mode. The planetary ratio booster can include a ring gear, and the ring gear of the planetary ratio booster can be positioned axially between the electric motor and the large planet gears of the planetary gearset of the shiftable high ratio reducer. The planetary ratio booster can include an input shaft coupled to the electric motor. The differential can include at least one of a spur gear differential or a bevel gear differential.

BRIEF DESCRIPTION OF THE DRAWING(S)

The foregoing Summary as well as the following Detailed Description will be best understood when read in conjunction with the appended drawings, which illustrate a preferred embodiment according to the disclosure. In the drawings:

The FIGURE is a schematic illustration of an exemplary electric beam axle for a hybrid and/or electric vehicle in accordance with the present disclosure.

DETAILED DESCRIPTION OF THE PREFERRED EMBODIMENT(S)

Certain terminology is used in the following description for convenience only and is not limiting. The words "front", "rear", "upper", and "lower" designate directions in the drawings to which reference is made. The words "inwardly" and "outwardly" refer to directions towards and away from parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terms "generally" and "approximately" are to be construed as within 10% of a stated value or ratio. The terminology includes the words specifically noted above, derivatives thereof, and words of similar import.

The FIGURE is a schematic illustration of an exemplary electric beam axle 10 for use in a hybrid and/or electric vehicle. The FIGURE schematically illustrates only one half of a gearbox of the electric beam axle 10, but it is to be understood that at least some of the components and features of the gearbox are axially aligned with and surround an axis of rotation AR of the electric beam axle 10, discussed further below. In some examples, the axis of rotation AR can be an axis of rotation of wheels/tires coupled to the electric beam axle 10. Further, the electric beam axle 10 will hereinafter be referred to as the "axle 10", but it is to be understood that the "electric beam axle 10" and the "axle 10" are used synonymously to refer to the same component/assembly.

The axle 10 is a beam axle for a hybrid and/or electric vehicle (i.e. a hybrid and/or electric automobile), and the axle 10 is configured to transfer rotational energy from an electric motor 14 to the wheels/tires of the vehicle (not shown). In some embodiments, the axle 10 can be a front axle of the hybrid and/or electric vehicle. In other examples, the axle 10 can be a rear axle of the hybrid and/or electric vehicle.

As shown in the FIGURE, the axle 10 includes the electric motor 14, an input shaft 18, a high-speed planetary ratio booster 24, a shiftable high ratio reducer 22, and a differential 26. In some examples, the input shaft 18 can be a hollow shaft that is axially aligned with the axis of rotation AR of the axle 10.

The electric motor 14 can be an electric motor that converts electrical energy into mechanical energy, such as for example rotational energy that is provided to an output shaft of the electric motor 14. In some examples, the electric motor 14 can surround and be positioned concentric with the axis of rotation AR of the axle 10.

The input shaft 18 extends between and couples the electric motor 14 to the planetary ratio booster 24. The planetary ratio booster 24 includes a sun gear 70, a ring gear 72 and a plurality of planet gears 74 supported by a planet carrier 78. The carrier 78 of the planetary ratio booster 24 is coupled to the shiftable high ratio reducer 22.

More specifically, the carrier 78 is coupled to the shiftable high ratio reducer 22 for transferring the rotational energy from the electric motor 14 to the shiftable high ratio reducer 22. The shiftable high ratio reducer 22 is aligned coaxially with the planetary ratio booster 24. The shiftable high ratio reducer 22 includes a compound planetary gearset 30 that is shiftable between a first position I and a second position II, as described in more detail below. When position I is selected, the e-axle 10 delivers a normal drive ratio with high efficiency. When position II is selected, the e-axle 10 delivers a high torque drive ratio with best possible efficiency.

The planetary gearset 30 of the shiftable high ratio reducer 22 includes a sun gear 40 driven by the input shaft carrier 78 of the planetary booster 24, a first ring gear 44, a second ring gear 48, and a plurality of stepped planet gears 50 supported by a planet carrier 52. Each stepped planet gear 50 includes a large planet gear 56 interposed between the sun gear 40 and the first ring gear 44 and a small planet gear 60 meshed with the second ring gear 48 (e.g., the large planet gear 56 and the small planet gear 60 of each stepped planet gear 50 are rigidly coupled, for example, one solid part). A first clutch 61 is configured to selectively engage the first ring gear 44 (e.g., fix the first ring gear 44 against rotation) and a second clutch 62 is configured to selectively engage the second ring gear 48 (e.g., fix the second ring gear 48 against rotation).

An output of the shiftable high ratio reducer 22 is coupled to the differential 26. Axle half shafts 80 and 82 couple the differential 26 to the wheels/wheel hubs (not shown) of a vehicle. In some embodiments, the differential 26 can be a spur gear differential or a bevel gear differential, for example.

In the illustrated example, the planetary ratio booster 24 is coaxially aligned with the shiftable high ratio reducer 22 and further arranged such that the ring gear 72 positioned axially between the electric motor 14 and the large planet gears 56 of the shiftable high ratio reducer 22.

In operation, the shiftable high ratio reducer 22 is shiftable between a) position I with the second ring gear 48 coupled to differential 26 by clutch 62 (with clutch 61 engaged with first ring gear 44) for normal (high) range operations with a combined gear ratio of around i=18-23, for example, and b) position II with the planet carrier 52 coupled to the differential 26 by clutch 62 (with clutch 61 released) with a combined gear ratio of around i=60, for low-range operations. It will be appreciated that other gear ratios are possible.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein. It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

10 Electric Beam Axle
14 Electric Motor
18 Input Shaft
22 Shiftable High Ratio Reducer
24 Planetary Ratio Booster
26 Differential
30 Compound Planetary Gearset
40 Sun Gear
44 First Ring Gear
48 Second Ring Gear
50 Stepped Planet Gears
52 Planet Carrier
56 Large Planet Gear
60 Small Planet Gear
61 Clutch
62 Clutch
70 Sun Gear
72 Ring Gear
74 Planet Gears
78 Planet Carrier
80 Axle Shaft
82 Axle Shaft
AR Axis of Rotation

What is claimed is:

1. An electric beam axle for a hybrid or electric vehicle, the electric beam axle comprising:
   an electric motor;
   a planetary ratio booster coupled to the electric motor;
   a shiftable high ratio reducer driven by the planetary ratio booster; and
   a differential driven by the shiftable high ratio reducer and connectable to a first vehicle wheel and a second vehicle wheel,
   wherein the electric motor, planetary ratio booster, shiftable high ratio reducer, and differential are coaxially aligned; and
   wherein the shiftable high ratio reducer includes a compound planetary gearset having a plurality of stepped planet gears supported by a planet carrier.

2. The electric beam axle of claim 1, wherein the compound planetary gearset includes a first ring gear and a second ring gear.

3. The electric beam axle of claim 2, wherein each stepped planet gear includes a large planet gear meshed to the first ring gear and a small planet gear meshed to the second ring gear, and wherein the large planet gear and small planet gear rotate together and are connected to transfer torque.

4. The electric beam axle of claim 3, wherein the compound planetary gearset of the shiftable high ratio reducer includes at least one clutch for selectively engaging the planet carrier with the differential in a first drive mode.

5. The electric beam axle of claim 4, wherein the at least one clutch selectively engages the second ring gear with the differential in a second drive mode.

6. The electric beam axle of claim 3, wherein the planetary ratio booster includes a ring gear, and wherein the ring gear of the planetary ratio booster is positioned axially between the electric motor and the large planet gears of the planetary gearset of the shiftable high ratio reducer.

7. The electric beam axle of claim 1, wherein the planetary ratio booster includes an input shaft coupled to the electric motor.

8. The electric beam axle of claim 1, wherein the differential includes at least one of a spur gear differential or a bevel gear differential.

9. A gear train for an electric vehicle comprising:
a planetary ratio booster having an input shaft for receiving rotational energy from an electric motor;
a shiftable high ratio reducer driven by the planetary ratio booster; and
a differential driven by the shiftable high ratio reducer and connectable to a first vehicle wheel and a second vehicle wheel;
wherein the planetary ratio booster, shiftable high ratio reducer, and differential are coaxially aligned; and
wherein the shiftable high ratio reducer includes a compound planetary gearset having a plurality of stepped planet gears supported by a planet carrier.

10. The gear train of claim 9, wherein the planetary gearset includes a first ring gear and a second ring gear.

11. The gear train of claim 10, wherein each stepped planet gear includes a large planet gear meshed to the first ring gear and a small planet gear meshed to the second ring gear, and wherein the large planet gear and small planet gear rotate together and are connected to transfer torque.

12. The gear train of claim 11, wherein the compound planetary gearset of the shiftable high ratio reducer includes at least one clutch for selectively engaging the planet carrier with the differential in a first drive mode.

13. The gear train of claim 12, wherein the at least one clutch selectively engages the second ring gear with the differential in a second drive mode.

14. The gear train of claim 9, wherein the differential includes at least one of a spur gear differential or a bevel gear differential.

* * * * *